United States Patent
Lalonde et al.

(10) Patent No.: US 9,313,454 B2
(45) Date of Patent: Apr. 12, 2016

(54) AUTOMATED PRIVACY ADJUSTMENTS TO VIDEO CONFERENCING STREAMS

(75) Inventors: Paul Lalonde, Victoria (CA); Douglas Carmean, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/124,522

(22) PCT Filed: Oct. 1, 2011

(86) PCT No.: PCT/US2011/054488
§ 371 (c)(1),
(2), (4) Date: Aug. 27, 2014

(87) PCT Pub. No.: WO2012/094042
PCT Pub. Date: Jul. 12, 2012

(65) Prior Publication Data
US 2014/0368604 A1    Dec. 18, 2014

Related U.S. Application Data

(60) Provisional application No. 61/494,034, filed on Jun. 7, 2011.

(51) Int. Cl.
*H04N 7/14*   (2006.01)
*H04N 7/15*   (2006.01)
*G06K 9/00*   (2006.01)
*H04N 5/33*   (2006.01)

(52) U.S. Cl.
CPC ............. *H04N 7/15* (2013.01); *G06K 9/00221* (2013.01); *H04N 5/33* (2013.01); *H04N 7/147* (2013.01)

(58) Field of Classification Search
CPC ......................................................... H04N 7/14
USPC ........... 348/14.01, 14.03, 14.07, 14.08, 14.12
See application file for complete search history.

(56) References Cited

U.S. PATENT DOCUMENTS

| | | | |
|---|---|---|---|
| 7,379,560 B2 | 5/2008 | Bradski et al. | |
| 7,564,476 B1 * | 7/2009 | Coughlan | H04N 7/147 348/14.01 |
| 7,768,543 B2 * | 8/2010 | Christiansen | 348/14.08 |
| 8,044,989 B2 * | 10/2011 | Mareachen | H04N 7/147 348/14.08 |

(Continued)

FOREIGN PATENT DOCUMENTS

| | | |
|---|---|---|
| KR | 10-2002-0003310 A | 1/2002 |
| WO | 2012/094042 A1 | 7/2012 |
| WO | 2012/094042 A8 | 7/2012 |

OTHER PUBLICATIONS

International Preliminary Report on Patentability received for PCT application No. PCT/US2011/054488, mailed on Jul. 18, 2013, 8 Pages.

(Continued)

*Primary Examiner* — Olisa Anwah
(74) *Attorney, Agent, or Firm* — Jordan IP Law, LLC

(57) ABSTRACT

Methods and systems may involve determining a user attention level based on video stream data associated with a first participant in an always-on video conferencing session. The video stream data may be modified based on the user attention level to obtain modified video stream data that is automatically adjusted for privacy. In addition, the modified video stream data may be transmitted to one or more other participants in the video conferencing session.

30 Claims, 3 Drawing Sheets

(56) References Cited

U.S. PATENT DOCUMENTS

| | | | | |
|---|---|---|---|---|
| 8,392,503 | B2* | 3/2013 | Kuhlke | H04L 12/1822 348/14.01 |
| 8,462,191 | B2* | 6/2013 | DeGrazia | H04N 7/147 348/14.01 |
| 8,750,472 | B2* | 6/2014 | Shun | H04L 67/22 348/14.08 |
| 8,976,218 | B2* | 3/2015 | Thorson | H04N 7/15 348/14.03 |
| 2005/0099492 | A1 | 5/2005 | Orr | |
| 2009/0041311 | A1* | 2/2009 | Hundley | H04N 21/4223 382/118 |
| 2010/0064010 | A1 | 3/2010 | Alkov et al. | |
| 2010/0303289 | A1* | 12/2010 | Polzin et al. | 382/103 |
| 2011/0063440 | A1 | 3/2011 | Neustaedter et al. | |
| 2014/0028785 | A1* | 1/2014 | Valentine et al. | 348/14.08 |

OTHER PUBLICATIONS

International Search Report and Written Opinion received for PCT Patent Application No. PCT/US2011/054488, mailed on May 4, 2012, 11 Pages.

Walker Burgin et al., "Using Depth Information to Improve Face Detection", Human-Robot Interaction, ACM, Mar. 6, 2011, pp. 119-120, New York USA.

Kong S. G. et al., "Recent Advances in Visual and Infrared Face Recognition—a review", Computer Vision and Image Understanding, Jan. 1, 2005, pp. 103-134, vol. 97-1, Academic Press, USA.

Extended European Search Report for European Patent Application 11854996.3, dated May 15, 2015, 10 pages, European Patent Office.

\* cited by examiner

US 9,313,454 B2

AUTOMATED PRIVACY ADJUSTMENTS TO VIDEO CONFERENCING STREAMS

CROSS-REFERENCE TO RELATED APPLICATIONS

This patent application claims the benefit of priority to U.S. Provisional Patent Application No. 61/494,034 filed Jun. 7, 2011, and PCT Application No. PCT/US2011/054488 filed Oct. 1, 2011.

BACKGROUND

Traditional video conferences may suffer from setup time and a lack of knowledge of participants' willingness or availability to share a video image. While an "always-on" video stream may address participant availability, the always-on feed may introduce new privacy issues.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may include a computer readable storage medium having a set of instructions which, if executed by a processor, cause a computer to determine a user attention level based on video stream data associated with a first participant in a video conferencing session. The instructions may also cause a computer to modify the video stream data based on the user attention level to obtain modified video stream data, and transmit the modified video stream data to a second participant in the video conferencing session.

Figure 1:
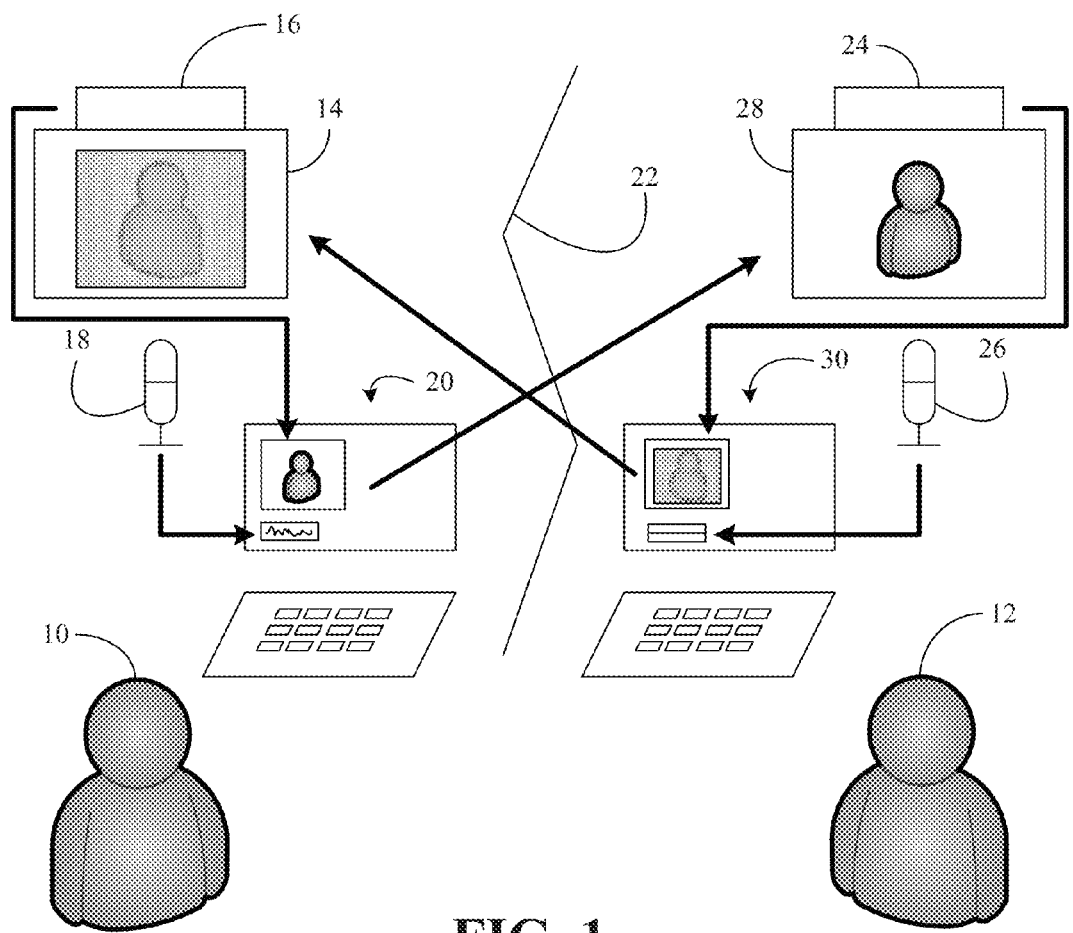
FIG. 1 is a block diagram of an example of a video conferencing environment according to an embodiment.

Turning now to FIG. 1, a video conferencing environment is shown in which a first participant 10 conducts an "always-on" video conferencing session with a second participant 12. In the illustrated example, a camera 16 and microphone 18 capture video and audio content, respectively, of the first participant 10, who uses a display (e.g., television/monitor with audio output capability) 14 to view and listen to video and audio content (e.g., video stream data) of the second participant 12. The audio content may be embedded in the video stream data. The video stream data of the first participant 10 may be processed by a computing system 20 prior to transmission to the second participant over a network 22. Similarly, a camera 24 and microphone 26 may capture video stream data of the second participant 12, who may use a display 28 to view and listen to the video stream data of the first participant 10. Thus, the video stream data of the second participant 12 may be processed by a computing system 30 prior to transmission to the first participant 10 over the network 22. In the illustrated example, the computing system 30 determines that the second participant 12 is not paying attention to the display 28, and therefore modifies the video stream data to make the second participant 12 less visible (e.g., blurred) and less audible (e.g., muted) from the perspective of the first participant 10. Thus, the illustrated approach automatically provides more privacy to the second participant 12 during periods of inattention.

As will be discussed in greater detail, the cameras 16, 24 may each include both an RGB (red-green-blue) image capture device and a depth image capture device. The RGB image capture device may be a standard 2D (two-dimensional) device, whereas the depth image capture device may include, for example, an IR (infrared) device such as the Kinect device available from Microsoft Corporation, of Redmond Wash. For example, the IR device may include a structured light emitter operative in the IR spectrum and an IR camera that captures an IR image from which depth information may be calculated. Other technologies such as time-of-flight camera technology, and so forth, may be used to identify depth information.

Moreover, the computing systems 20, 30 may include logic to extract candidate face regions from RGB-depth data, as well as logic to determine if a face is present in candidate face regions (e.g., face recognition software). In one example, a Haar Feature Classifier with a reflectional symmetry based frontal-face training set may be used for frontal face detection. Thus, a front-facing face in the video stream data may be equated as a signifier of attention. Other attention detection approaches may also be used. The use of a depth image capture device may provide greater efficiency (e.g., faster user attention level determinations) than a system based solely on an RGB image capture device.

Figure 2:
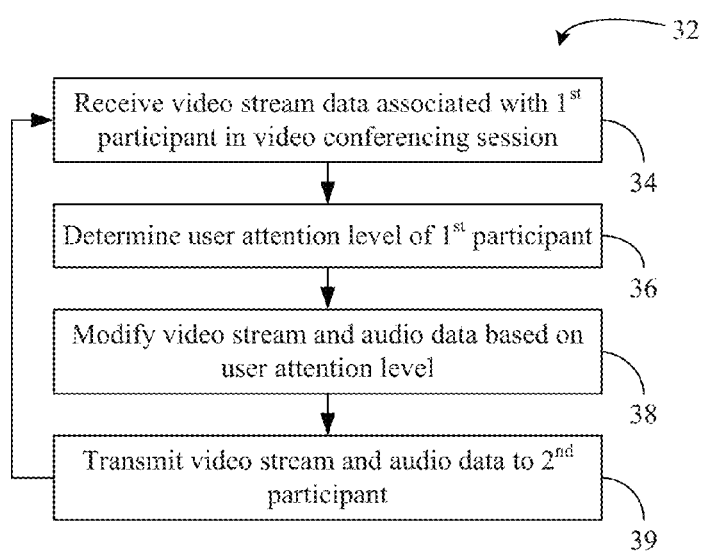
FIG. 2 is a flowchart of an example of a method of processing video stream data according to an embodiment.

FIG. 2 shows a method 32 of processing video stream data. The method 32 may be implemented as a set of executable logic instructions stored in a machine- or computer-readable storage medium such as random access memory (RAM), read only memory (ROM), programmable ROM (PROM), flash memory, firmware, microcode, etc., in fixed-functionality hardware using circuit technology such as application specific integrated circuit (ASIC), complementary metal oxide semiconductor (CMOS) or transistor-transistor logic (TTL) technology, or any combination thereof. For example, computer program code to carry out operations shown in the method 32 may be written in any combination of one or more programming languages, including an object oriented programming language such as C++ or the like and conventional procedural programming languages, such as the "C" programming language or similar programming languages. Moreover, various aspects of the method 32 could be implemented as embedded logic of a processor using any of the aforementioned circuit technologies. In one example, the method 32 is implemented at the device driver level to enable the use of any transport mechanism for the video conference streams.

Processing block 34 provides for receiving video stream data associated with a first participant in a video conferencing session. In one example, the video conferencing session may be an always-on session in which the participant may at times be inattentive or even physically absent. A user attention level of the first participant may be determined block 36. As already noted, a reflectional symmetry based Haar Feature Classifier may be used to determine the user attention level. Illustrated block 38 modifies the video stream and audio data based on the user attention level. The modification applied to the video stream data may be any appropriate privacy-preserving filter. For example, box filter blurs, Gaussian blurs, contrast reducing (e.g., darkening) methods, and so forth, may be used to increase the privacy of the outgoing video stream data.

Figure 3:
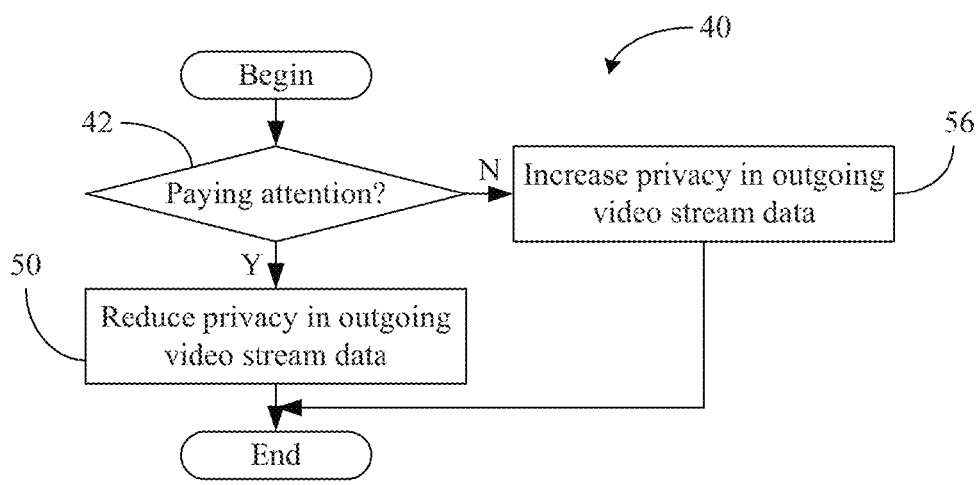
FIG. 3 is a flowchart of an example of a method of modifying video stream data based on user attention level according to an embodiment.
Figure 4A:
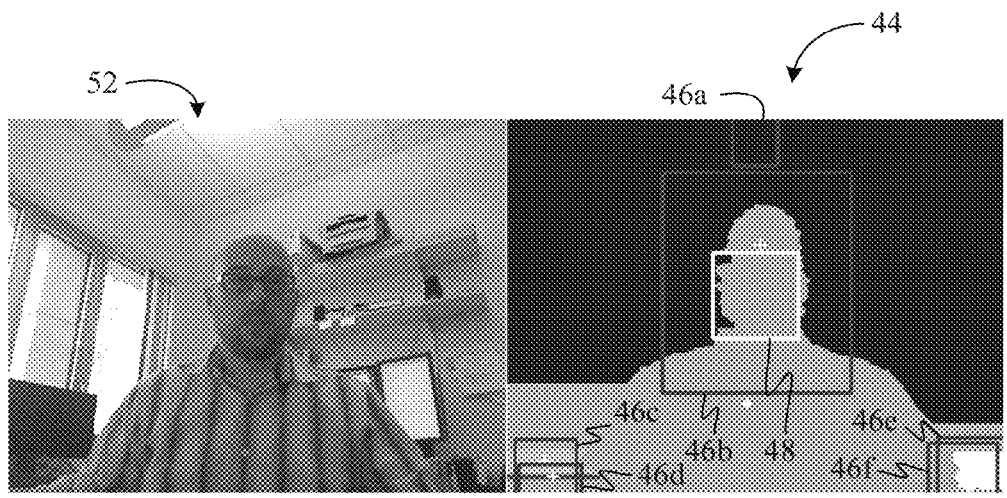
FIGS. 4A and 4B are screenshots of examples of video conferencing displays according to embodiments.
Figure 4B:
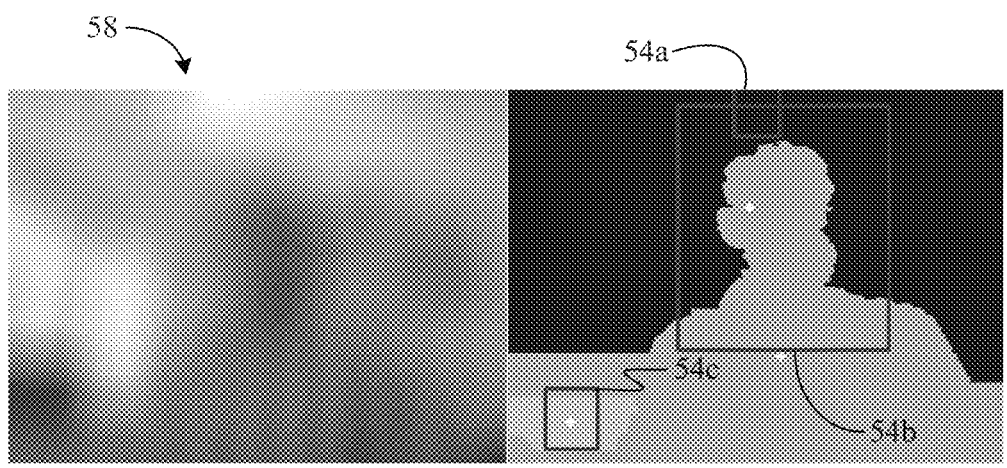

Turning now to FIGS. 3, 4A and 4B, a method 40 of modifying video stream data based on user attention level and the resulting video content is shown. Illustrated block 42 determines whether the video stream data reflects that one or more participants are paying attention. For example, a face analysis panel 44 demonstrates that one or more candidate face regions 46 (46a-46f) may be identified based on the data from the depth image capture device. In particular, one region 46a may correspond to a rear wall, whereas another region 46c may correspond to an object on a desk at a different distance from the image capture device, while still another region 46b may correspond to the head of the participant. In the illustrated example, an attentive (e.g., front facing) face region 48 is detected in the candidate face region 46.

If it is determined, as in the case of FIG. 4A, that the participant is paying attention, block 50 may reduce the privacy in the outgoing video data stream. Accordingly, a video output 52 in which the participant is fully visible may result. In addition, the audio content may be increased to a relatively high level such as the full volume level.

If, on the other hand, it is determined that one or more candidate face regions 54 (54a-54c) do not contain an attentive face region, then it may be inferred that the participant is either not paying attention or physically absent from the video capture area. Accordingly, block 56 may increase the privacy in the output video data stream so that a video output 58 is blurred to prevent the participant from being seen fully. Moreover, the audio content may also be muted or otherwise reduced in volume. Thus, each time interval in which an attentive face is detected, the attention measure may be incremented by some gain. When no face is seen, an attention measure may be decremented by a different gain. This attention measure may then be used to set the privacy level (e.g., from 0-100%) according to some transfer function. For the blur cases, a blur kernel radius inversely related to the privacy level may be used. For audio, a volume setting (e.g., from 0-100%) inversely related to the privacy level may be used.

As will be discussed in greater detail, the gain for controlling the privacy increase in block 56 may be higher than the gain for controlling the privacy decrease in block 50 in order to implement a tunable hysteresis functionality that accounts for brief looks away, etc. Returning to FIG. 2, illustrated block 39 provides for transmitting the modified video stream and audio data to a second participant in the video conferencing session.

Figure 5:
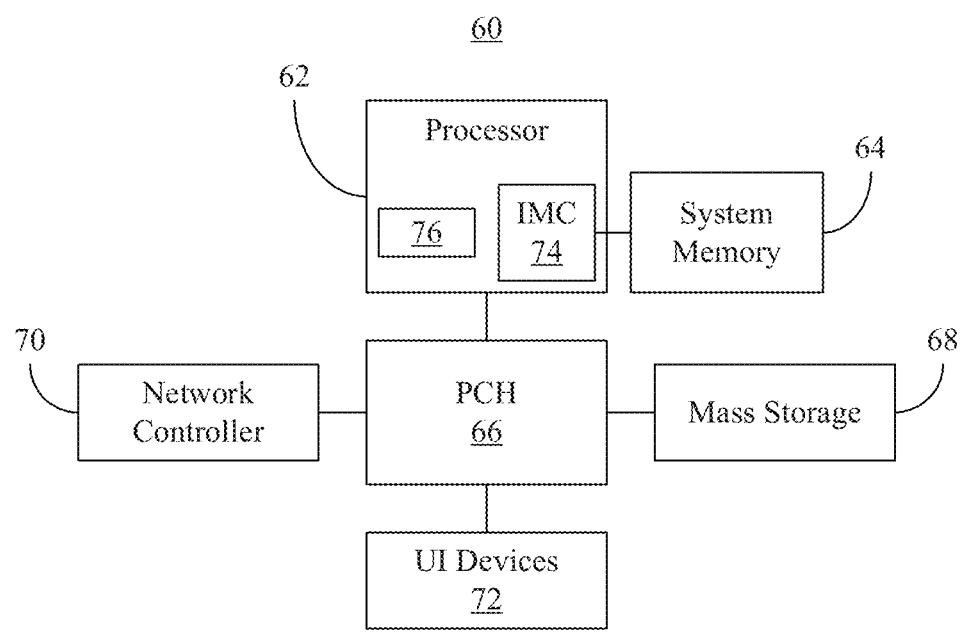
FIG. 5 is a block diagram of an example of a computing system according to an embodiment.

FIG. 5 shows computing platform 60 having a processor 62, system memory 64, a platform controller hub (PCH) 66, mass storage (e.g., hard disk drive/HDD, optical disk, flash memory) 68, a network controller 70, one or more user interface (UI) devices 72 and various other controllers (not shown). The platform 60 may be part of a mobile platform such as a laptop, personal digital assistant (PDA), wireless smart phone, media player, imaging device, mobile Internet device (MID), any smart device such as a smart phone, smart tablet, smart TV and so forth, or any combination thereof. In addition, the platform 60 may also be part of a fixed platform such as a personal computer (PC), server, workstation, etc. Indeed, the platform 60 may be partially or totally incorporated into a video conferencing display such as displays 14, 28 (FIG. 1), already discussed. Thus, the processor 62 may include one or more processor cores capable of executing a set of stored logic instructions, and an integrated memory controller (IMC) 74 configured to communicate with the system memory 64. The system memory 64 may include, for example, dynamic random access memory (DRAM) configured as a memory module such as, for example, a dual inline memory module (DIMM), a small outline DIMM (SODIMM), etc.

In the illustrated example, the processor 62 is configured to execute logic 76 that receives video stream data associated with a video conferencing session, determines user attention levels based on video stream data, modifies the video stream data based on the user attention levels, and transmits the modified video stream data to other participants in the video conferencing session. Thus, the logic 76 may implement one or more aspects of the method 32 (FIG. 2), already discussed. As already noted, the logic 76 may be implemented at the device driver level.

The illustrated PCH 66, sometimes referred to as a Southbridge of a chipset, functions as a host device and may communicate with the network controller 70, which could provide off-platform wireless communication functionality for a wide variety of purposes such as, for example, cellular telephone (e.g., W-CDMA (UMTS), CDMA2000 (IS-856/IS-2000), etc.), WiFi (e.g., IEEE 802.11, 1999 Edition, LAN/MAN Wireless LANS), Low-Rate Wireless PAN (e.g., IEEE 802.15.4-2006, LR-WPAN), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes. The network controller 60 may also provide off-platform wired communication (e.g., RS-232 (Electronic Industries Alliance/EIA), Ethernet (e.g., IEEE 802.3-2005, LAN/MAN CSMA/CD Access Method), power line communication (e.g., X10, IEEE P1675), USB (e.g., Universal Serial Bus 2.0 Specification), digital subscriber line (DSL), cable modem, T1 connection), etc., functionality. The UI (e.g., touch screen, liquid crystal display/LCD, light emitting diode/LED, keyboard, mouse, etc.) devices 72 may be capable of enabling a user to interact with and perceive information from the platform 60.

A pseudo-code implementation of the above-described techniques may be written, for example, as follows.

```
MAXPUBLIC = 200; // Vary this to increase hysteresis
Publicness = MAXPUBLIC;
For each frame of input (DepthIn, ColourIn) {
    Identify head candidate regions in DepthIn (work in a span-
    segmented world space, can elaborate this algorithm if necessary;
depth-based segmentation.)
    Map candidate regions to ColourIn (includes calibration of DepthIn
and ColourIn images)
    k = Count of faces in candidate regions in ColourIn (eg using a Haar
Cascade Classifier)
    if (k > 0) Publicness += k * GAIN;
    else Publicness -= LOSS;
    Clamp Publicness to (0, MAXPUBLIC)
    ColourImageOut = BlurByPercentage(ColourIn, MAX(0, 100 –
Publicness));
    SetAudioVolume(MIN(100, Publicness));
    EmitToVideoConference(ColourImageOut);
}
```

Thus, embodiments may include a system having an image capture device to obtain first video stream data associated with a first participant in a video conferencing session, and logic to determine a user attention level based on the first video stream data. The logic may also modify the first video stream data based on the user attention level to obtain modified video stream data, and transmit the modified video stream data to a second participant in the video conferencing session.

Embodiments may also involve a computer implemented method in which a user attention level is determined based on video stream data associated with a first participant in a video conferencing session. The method may also provide for modifying the video stream data based on the user attention level to obtain modified video stream data, and transmitting the modified video stream data to a second participant in the video conferencing system.

Certain aspects of embodiments of the present invention may be implemented using hardware, software, or a combination thereof and may be implemented in one or more computer systems or other processing systems. Program code may be applied to the data entered using an input device to perform the functions described and to generate output information. The output information may be applied to one or more output devices. One of ordinary skill in the art may appreciate that embodiments may be practiced with various computer system configurations, including multiprocessor systems, minicomputers, mainframe computers, and the like. Embodiments may also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the methods described herein. Alternatively, the methods may be performed by specific hardware components that contain hard-wired logic for performing the methods, or by any combination of programmed computer components and custom hardware components. The methods described herein may be provided as a computer program product that may include a machine readable medium having stored thereon instructions that may be used to program a processing system or other electronic device to perform the methods. The term "machine readable medium" or "machine accessible medium" used herein shall include any medium that is capable of storing or encoding a sequence of instructions for execution by the machine and that causes the machine to perform any one of the methods described herein. The terms "machine readable medium" and "machine accessible medium" may accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

We claim:

1. A system comprising:
an image capture device to obtain first video stream data associated with a first participant in a video conferencing session; and
logic to,
determine a user attention level based at least on whether a front-facing face is detected in the first video stream data,
modify the first video stream data based at least on the user attention level to obtain modified video stream data, and
transmit the modified video stream data to a second participant in the video conferencing session,
wherein the logic is to,
increment an attention measure by a first gain if the user attention level indicates that the first participant is paying attention to the video conferencing session, and
decrement the attention measure by a second gain if the user attention level indicates that the first participant is not paying attention to the video conferencing session, wherein the first video stream data is to be modified based at least on the attention measure.

2. The system of claim 1, wherein the image capture device includes a two-dimensional (2D) component and a depth capture component, and the logic is to identify 2D information and depth information in the first video stream data.

3. The system of claim 2, wherein the depth capture component includes:
a structured light emitter operative in the IR spectrum; and
an IR camera to capture an IR image, wherein the logic is to identify the depth information based at least on the IR image.

4. The system of claim 2, wherein the logic is to,
use the depth information to identify one or more candidate face regions,
extract the one or more candidate face regions from the first video stream data, and
conduct a face recognition analysis on the one or more candidate face regions.

5. The system of claim 4, wherein the logic is to use a front-facing face as a signifier of attention in the face recognition analysis.

6. The system of claim 1, wherein the first gain is to be greater than the second gain.

7. The system of claim 1, wherein the logic is to modify at least one of a blur characteristic and a contrast characteristic of the first video stream data based at least on the attention measure.

8. The system of claim 1, wherein the logic is to modify an audio volume of the video stream data based at least on the attention measure.

9. The system of claim 1, further including a network controller, wherein the logic is to transmit the modified video stream data to the second participant via the network controller.

10. The system of claim 9, wherein the network controller is to transmit the modified video stream data to a plurality of participants in the video conferencing session.

11. The system of claim 1, further including a display to output second video stream data associated with the second participant in the video conferencing session.

12. A computer implemented method comprising:
   determining a user attention level based at least on whether a front-facing face is detected in video stream data associated with a first participant in a video conferencing session;
   modifying the video stream data based at least on the user attention level to obtain modified video stream data;
   transmitting the modified video stream data to a second participant in the video conferencing session;
   incrementing an attention measure by a first gain if the user attention level indicates that the first participant is paying attention to the video conferencing session; and
   decrementing the attention measure by a second gain if the user attention level indicates that the first participant is not paying attention to the video conferencing session, wherein modifying the video stream data includes modifying the video stream data based at least on the attention measure.

13. The method of claim 12, further including identifying two-dimensional (2D) information and depth information in the video stream data.

14. The method of claim 13, wherein the depth information includes infrared (IR) information.

15. The method of claim 13, wherein determining the user attention level includes:
   using the depth information to identify one or more candidate face regions;
   extracting the one or more candidate face regions from the video stream data; and
   conducting a face recognition analysis on the one or more candidate face regions.

16. The method of claim 15, further including using a front-facing face as a signifier of attention in the face recognition analysis.

17. The method of claim 12, wherein the first gain is greater than the second gain.

18. The method of claim 12, wherein modifying the video stream data includes modifying at least one of a blur characteristic and a contrast characteristic of the video stream data based at least on the attention measure.

19. The method of claim 12, wherein modifying the video stream data includes modifying an audio volume of the video stream data based at least on the attention measure.

20. A non-transitory computer readable storage medium comprising a set of instructions which, if executed by a processor, cause a computer to:
   determine a user attention level based at least on whether a front-facing face is detected in video stream data associated with a first participant in a video conferencing session;
   modify the video stream data based at least on the user attention level to obtain modified video stream data;
   transmit the modified video stream data to a second participant in the video conferencing session;
   increment an attention measure by a first gain if the user attention level indicates that the first participant is paying attention to the video conferencing session; and
   decrement the attention measure by a second gain if the user attention level indicates that the first participant is not paying attention to the video conferencing session, wherein the video stream data is to be modified based at least on the attention measure.

21. The medium of claim 20, wherein the instructions, if executed, cause a computer to identify two-dimensional (2D) information and depth information in the video stream data.

22. The medium of claim 21, wherein the depth information is to include infrared (IR) information.

23. The medium of claim 21, wherein the instructions, if executed, cause a computer to:
   use the depth information to identify one or more candidate face regions,
   extract the one or more candidate face regions from the video stream data; and
   conduct a face recognition analysis on the one or more candidate face regions.

24. The medium of claim 21, wherein the instructions, if executed, cause a computer to use a front-facing face as a signifier of attention in the face recognition analysis.

25. The medium of claim 20, wherein the first gain is to be greater than the second gain.

26. The medium of claim 20, wherein the instructions, if executed, cause a computer modify at least one of a blur characteristic and a contrast characteristic of the video stream data based at least on the attention measure.

27. The medium of claim 20, wherein the instructions, if executed, cause a computer to modify an audio volume of the video stream data based at least on the attention measure.

28. The system of claim 1, wherein the logic is to modify an audio volume of the video stream data based at least on the attention level.

29. The method of claim 12, wherein modifying the video stream data includes modifying an audio volume of the video stream data based at least on the attention level.

30. The medium of claim 20, wherein the instructions, if executed, cause a computer to modify an audio volume of the video stream data based at least on the attention level.

* * * * *